Sept. 23, 1958 H. SCHRODER, 2,852,980
INFRA-RED TRANSMITTING MIRROR
Filed Nov. 30, 1954 2 Sheets-Sheet 1

INVENTOR.
HUBERT SCHRODER
BY
ATTORNEYS

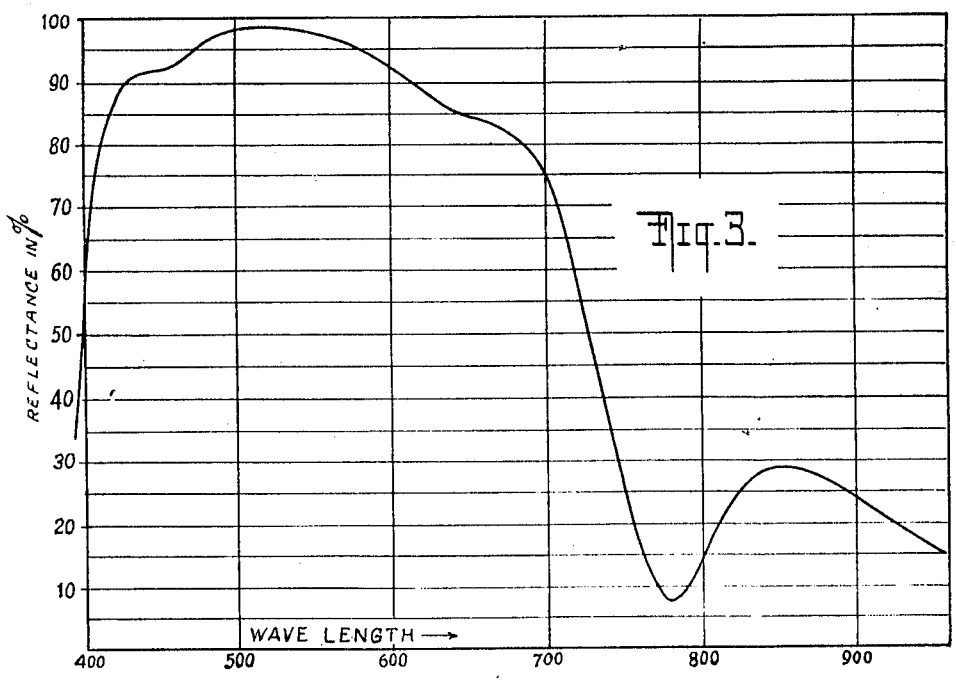
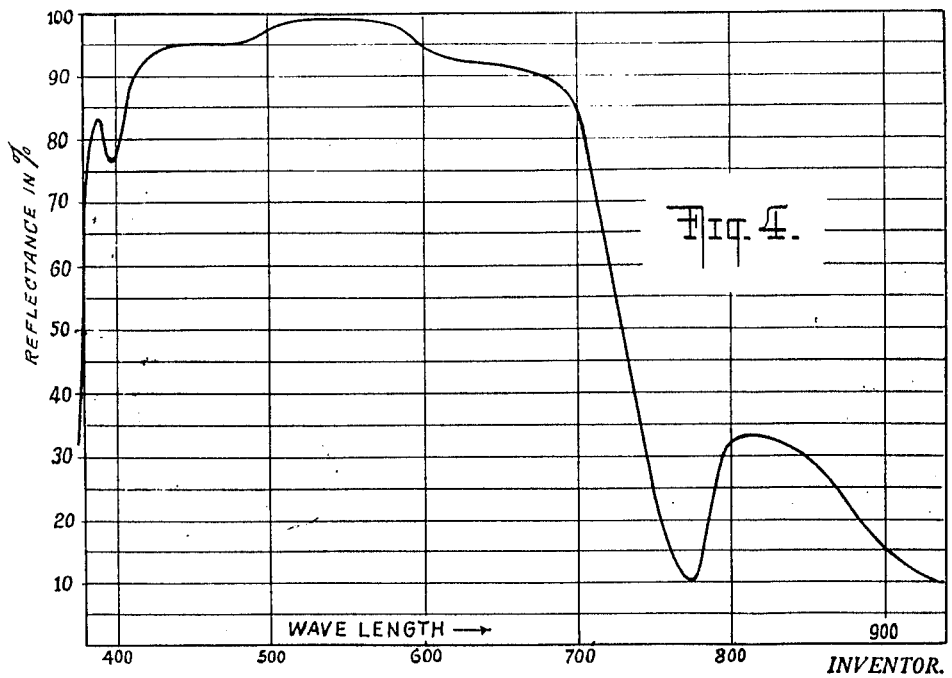

United States Patent Office 2,852,980
Patented Sept. 23, 1958

2,852,980

INFRA-RED TRANSMITTING MIRROR

Hubert Schroder, Munich, Germany

Application November 30, 1954, Serial No. 472,183

Claims priority, application Germany December 27, 1948

5 Claims. (Cl. 88—105)

This invention relates to optical instruments, projection lamps, searchlights, and the like, and more particularly to an improved mirror or reflector for use in such devices.

This application is a continuation-in-part of my application Serial No. 132,874, filed December 14, 1949, and resulting in U. S. Letters Patent No. 2,700,323, dated January 25, 1955.

In most optical arrangements and instruments which employ high light intensities, it is necessary to obviate the harmful effects of the heat rays which are also emitted by the available sources for providing such high light intensities. Heretofore, this was accomplished by placing in the path of the rays from such sources, special glasses capable of absorbing the heat rays. Such heat protective glasses were not satisfactory because they caused considerable light absorption and color variation of the transmitted light. They also had the disadvantage that the heat energy absorbed by them caused an increase in their temperature to such a degree that they were subject to the danger of cracking. Important progress has been made by the introduction of multi-layer interference films which make it possible to reflect infra-red rays almost without influencing the visible rays. However, it has not been possible with this type of selective filter to obtain the reflection of much more than 55–60% of the total heat rays, without also incurring a proportionate light loss in the visible range of the rays.

The principal object of the invention is to provide a mirror capable of obviating heat rays without being subject to the disadvantages of prior devices for this purpose.

Another object of the invention is to provide an improved mirror means which is capable of weakening the heat rays to a greater degree than has been accomplished by known prior means.

The foregoing objects are achieved in accordance with the invention by providing a deflecting mirror which, while having the highest possible reflecting capacity for the visible spectrum, is capable of passing rays in the infra-red range.

In my copending application Serial No. 132,874, it is disclosed that such a mirror may be realized by coating a supporting body, as for instance, a plate of glass, with a plurality of thin alternate layers of high and low index of refraction, of which at least some of the highly refracting layers are absorbent in the short wave region of the visible spectrum and substantially non-absorbent in the near infra-red region. Such a system of alternate layers produces by interference and absorption, a spectral reflection band which covers the principal part of the visible spectrum with high intensity, while the major portion of the impinging heat rays are passed therethrough. There is however, only a restricted number of coating substances having a suitable refraction and absorption curve to give a sufficiently broad reflection band by which a noticeable change in color of the reflected white light can be avoided. In some cases, as for instance, for layers composed of antimony sulphide, a slight shift of the reflection peak, as proposed in my said application, has proved useful to broaden the reflection band and to amplify the intensity in the yellow region of the spectrum. The materials fit for such layer systems are however, rather soft and sensitive to mechanical and chemical injuries. Furthermore, the reflection of the entire coating is minor when measured from the back side of the supporting body than from the front side.

The present invention avoids the necessity of applying soft and sensitive partly absorbing materials for the highly refracting layers. According to this invention, the problem to produce a reflection band of sufficient width throughout the visible spectrum is solved by coating the supporting body with two or more interference systems, each system consisting of an odd number of weakly or non-absorbing alternate layers of high and low refraction and of approximately $\lambda/4$-thicknesses for $\lambda=550$ to 600 m$\mu$. The said systems are separated from one another by a distance layer of at least the thickness of a single layer of said systems, and each system differs a little from another in the optical thickness of at least one layer and preferably of all inner layers.

A better understanding of the invention as well as other objects and the advantages thereof, will become more apparent after a perusal of the following description when read in connection with the accompanying drawings, in which Fig. 1 is a graph showing the spectral reflection curve of a single interference system of alternate high and low refracting layers of uniform optical thicknesses according to the prior art;

Fig. 3 is a graph showing the spectral reflection curve of two similar systems with slightly differing thicknesses combined in the above described manner;

Fig. 4 is a graph showing the effect of a combination of 13 interference layers with gradually varying optical thicknesses;

It is well known that a system of $m$ alternate thin layers with the high and low refraction indices $n_h$ and $n_l$, respectively, having negligible absorption and equal thicknesses on a dielectric support, yields a spectral reflectivity R which shows high maxima at those points for which the phase angle $\Delta$ of a single layer of the optical thickness $t$ is $$\Delta = 4\pi t/\lambda = (2z-1)\pi$$

for normal incidence of the light; $\lambda$ being the wave length and $z$ any integer. If $m$ is an odd number, the distance of the neighboring minima of R which characterizes the width of the reflection band is given in accordance with the theory by $$\delta\Delta = \frac{4\pi}{m+1}[1+F(m, n_h, n_l)]$$

wherein $F(m, n_h, n_l)$ increases with $(n_h-n_l)$ and the number $m$ of the layers to at most about 0.5. On the other side, the maximum reflection $R_{max}$ of such a layer system may satisfactorily be written by $$R_{max} \approx \tan h^2\left[(m+1)\frac{n_h-n_l}{n_h+n_l}\right]$$

Figure 1:
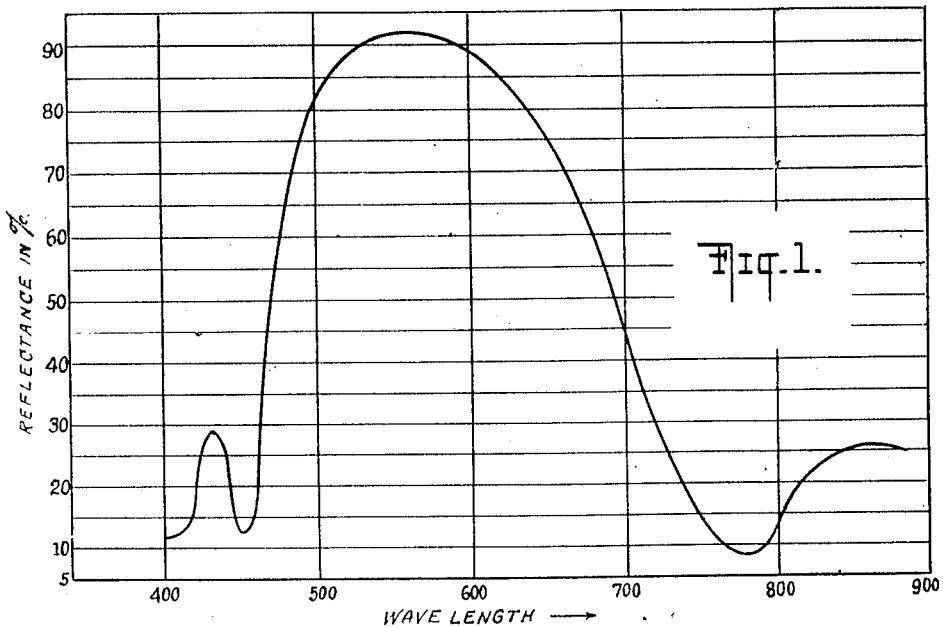

Thus, an optimum number of layers, depending on the values of $n_h$ and $n_l$, exists which renders the product $R_{max}\cdot\delta\Delta$ a maximum within the visible spectrum. In practice, with layer materials of the indices $n_h=2$, 3 and $n_l=1$, 4, the optimum number $m$ amounts to 7 to 9. If the peak reflection is centered at 560 m$\mu$ (Fig. 1), a total bandwidth $\delta\lambda \approx 300$ m$\mu$ is to be obtained by this layer system in the first order. This value however, relates to the distance of the neighboring reflection minima, whereas, the distance of the 0.75 $R_{max}$ points amounts to only about 180 m$\mu$, and consequently a beam of white light is subjected to a change of color at reflection.

According to my invention, this disadvantage is overcome by combining two or more layer systems of the kind aforementioned, which differ somewhat in the optical thickness of at least one layer and are separated by a spacing layer of low refraction.

Figure 2:
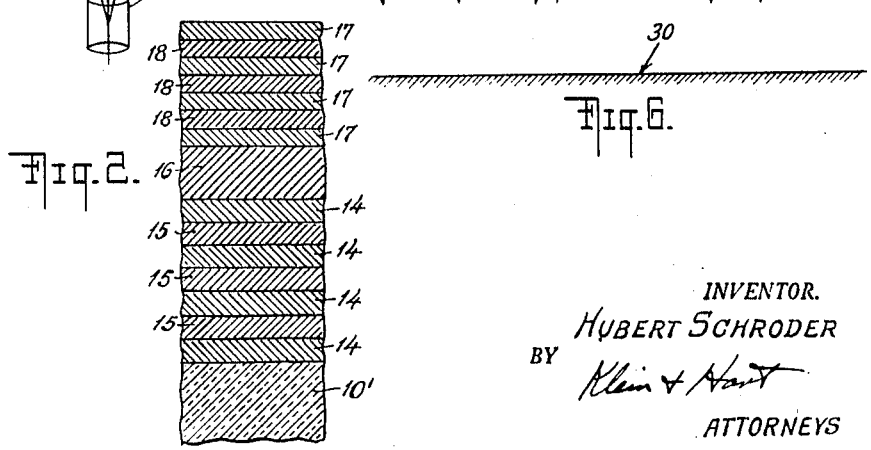
Fig. 2 is a cross-sectional view illustrating one form of practicing the present invention.

In Fig. 2 the construction of such a mirror is represented schematically in cross-section for the case of two multilayer interference systems combined together. In this figure the reference numeral 10' designates the support body which may be made of transparent or other suitable materials capable of passing heat rays therethrough. For the purposes of illustration, the support 10' is indicated as being a transparent or optical glass member. Deposited in alternate relation on the base 10' are layers 14 and 15 of high and low refractive indices, respectively, and forming one interference system. The system formed by layers 14 and 15 is separated from a second interference system composed of layers 17 of high index of refraction material alternately arranged with layers 18 of low index of refraction material by an intermediate layer 16 of a substance having a low index of refraction. Each of the highly refracting layers 14 and 17 in the combined reflector are composed of either materials which are weakly absorbent or non-absorbent in the visible spectrum such as zinc sulphide, zinc selenide, titanium dioxide, bismuth trioxide, lead chloride, or thallium iodide. Each of the low refracting layers 15, 16 and 18 may be composed of a fluoride such as magnesium fluoride, cryolite, or thorium fluoride, or of silica or quartz.

In the said case of two layer systems, one system (layers 14 and 15 of Fig. 2) may have a peak reflection centered at 480 m$\mu$ and the other system (layers 17 and 18) may have the same centered at 600 m$\mu$, so that the optical thicknesses of the layers in the first system are 120 m$\mu$, and those in the second system are 150 m$\mu$. The intermediate layer 16 of low refractive index material may have an optical thickness corresponding to from one-quarter to five medium wave lengths of the visible spectrum. In Fig. 2, layer 16 is shown for purposes of illustration as having an optical thickness greater than one-quarter wave length. In order to avoid the appearance of selective transmission bands inserted in the reflection band, it is preferred that the optical thickness of the intermediate layer 16 should not be equal to $\lambda_0/2$ or $3\lambda_0/2$; $\lambda_0$ being a medium wave length of the visible spectrum. The resultant spectral reflection curve, which is obtained with a spacing layer of about 140 m$\mu$ optical thickness is shown in Fig. 3. By so constructing the multilayer interference films, one can obtain a reflection band which is substantially broader than that of a single multilayer interference film of the same peak reflection intensity $R_{max}$ and having a 0.75. $R_{max}$-width of approximately 300 m$\mu$. Only at the red end of the visible spectrum does the reflection of this layer system drop abruptly and stay low (20-25% in the average) throughout the infra-red region. A reflector constructed as aforeindicated, will achieve a total reflecting power of 90 to 95% in the visible spectrum, while in the adjoining infra-red a transparency of at least 80% may be obtained. Inasmuch as the infra-red contains the heat rays which pass through the base 10', the reflected light will have a substantially low percentage of heat energy. It is an important advantage of this new type of infra-red transmitting reflector that it shows on the glass side nearly the same reflection as on the air side. Further advantages of the system are that the mirror has good optical qualities, being practically free of color, and has great mechanical resistance.

Though the combination of two multilayer interference systems constructed as aforedescribed, will give a sufficient reflection power for white light and high transmittance for the infra-red rays, further improvements of the efficiency may be obtained by extending the number of multilayer films and spacing layers inserted between them. It will be understood from the foregoing, that the more multilayer systems are combined, the smaller will be the differences in the optical layer thicknesses from system to system, and the lower the number of layers in each system that will be needed to cover the entire visible spectrum by the resultant reflection band. Following this principle, one finally can construct a high efficiency infra-red transmitting mirror by combining several highly refracting, weakly absorbent or non-absorbing layers of gradually increasing thicknesses separated from each other by spacing layers of low refraction and similarly increasing thicknesses, the median optical thickness of all high and low index layers corresponding to a quarter of a median wave length of the visible spectrum, and the minimum thickness of said layers corresponding to one-quarter of a wave length in the blue or violet region and the maximum thickness of said layers corresponding to one-quarter of a wave length in the yellow or red region of the spectrum. The spectral reflection curve of a layer system of this type consisting of 13 alternate $TiO_2$ and $SiO_2$ layers, the optical thickness of which varies gradually from 100 to 160 m$\mu$ is shown in Fig. 4. The measured 0.75. $R_{max}$-width of the mirror constructed in this manner, extends from 390 m$\mu$ to 730 m$\mu$, $R_{max}$ reaching 99% at 550 m$\mu$ and consequently, reflection of the white light occurs without any noticeable change in color. The reflection properties of such mirror are the same on the back and the front side and the mechanical and chemical resistance is very satisfactory. Due to the large band width of the visible reflection band this type of heat transmitting mirror does not change the color of the reflected rays at increased angles of incidence.

In order to obtain the highest possible transmission for the near infra-red range, an additional low refracting layer may be applied on the top of said combined multilayer film. The optical thickness of this outer layer should be in the order of half a median wave length of the visible spectrum. It may be composed preferably of thorium or magnesium fluoride or silica to give good surface hardness.

The above described layer arrangements are advantageous in all cases where the use of reflecting mirrors are required, and especially where damage by the reflected heat rays is to be avoided, such as in motion picture projection, reading instruments, or operation lamps, and the like.

In certain cases, as for stereo projection, it is desirable to use polarized light separated from the heat rays of the radiating light source. By slight deviations from the above said structure, one can construct a mirror as proposed in the present invention so that an originally unpolarized light beam impinging at oblique incidence is reflected as a substantially linearly polarized beam, while the major portion of the accompanying heat rays is passing through the said mirror. It is essential for this purpose to choose the layers of each multilayer system in such manner that the resulting amplitude | of the reflection vector component vibrating parallelly to the plane of incidence becomes as small as possible in the visible range, whereas the resulting amplitude $|\Re_v|$ of the reflection vector component vibrating vertically to the plane of incidence is to be made as great as possible. In the general case this requirement is expressed mathematically as follows:

$$\Re p = \sum_{a=1}^{m+1} r_a \exp\left(-i\sum_{k=1}^{a-1}\Delta k\right)[+\cdots] \approx s[i=\sqrt{-1}]$$

where $\Delta_k = (4\pi t_k \cos \Psi_k)/\lambda$ is the phase angle of the $k$th layer and $r_k$ the Fresnel reflection coefficient of the parallel vector component on the $k$th interface, the points in brackets indicating additional terms of the third and higher degree in $r_k$, which may be omitted for the first approximation. In a layer arrangement constructed in accordance with the requirements of this equation, the incident radiation strikes the mirror at an angle $\Psi_0$, which is connected with the refractive angles $\Psi_k$ by the Snellius law:

$$n_0 \sin \Psi_0 = n_l \sin \Psi_1 = \ldots = n_k \sin \Psi_k = \ldots$$

The incident angle $\Psi_0$ in this case is preferably large (at least 50°) so that a sufficiently high value (at least 50%) for the vertical polarization component $R_v$ will result within the visible spectrum. Thus, to give an example, if a beam of light is reflected at $\Psi_0 = 80°$, only two layers of a refractive index $n_1 = n_3 = 2.2$ embedding a layer of $n_2 = 1.45$ will suffice to produce a linearly polarized reflection with a peak intensity of about 60% for the perpendicularly vibrating component. The $\Delta_k$ should be approximately equal to $\pi$ in this case. If a higher efficiency is desired, the value of $\Psi_0$ which yields a vanishing $R_p$ increases further so that it is to be preferred to include the layer system between prisms. In this manner all layers may be struck at the polarizing angle of each interface and a very efficient polarization may be obtained. According to the above described principle, the optical thicknesses of the single layers should differ somewhat so that either two groups of respectively uniform multilayer systems are formed or one multilayer film gradually varies in optical thickness from layer to layer to form a total variance of about 25%. In this way, three advantages are realized simultaneously—colorlessness and strong reflection power, high infra-red transmittance, and efficient polarization.

Figures 5, 6:
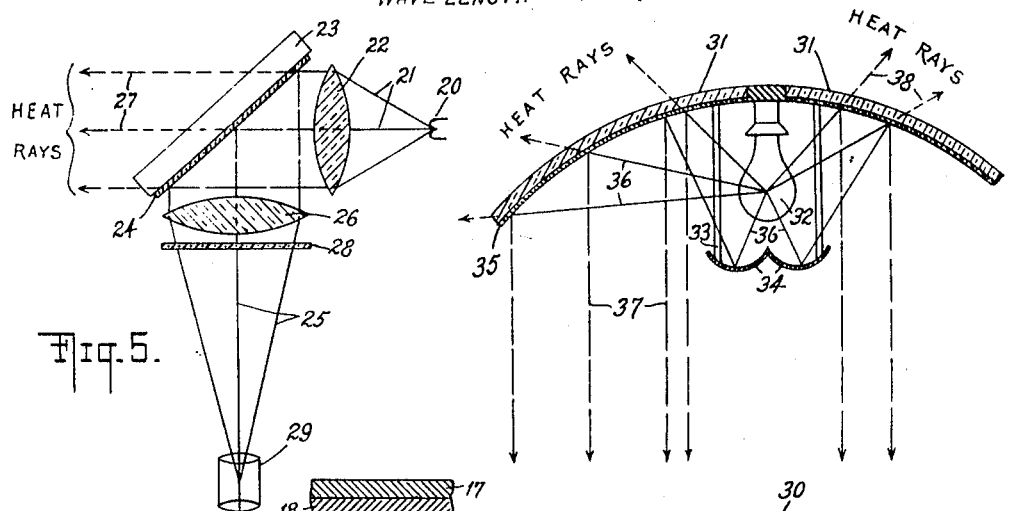
Fig. 5 is a diagrammatic view illustrating a form of the invention as applied to film projection.
Fig. 6 is a diagrammatic view illustrating a form of the invention as applied to an operation lamp.

An example of a practical application of the foregoing in film projecting apparatus is illustrated in Fig. 5 of the drawings. In the arrangement shown in Fig. 5, the reference numeral 20 generally designates a suitable light source, the unpolarized rays 21 of which are directed through a condenser 22 to a supporting body 23 constituted of optical glass and arranged so that its incident face is disposed at at least 45° to the rays emerging from the condenser 22. Provided on the incident face of the optical glass member 23 is a multilayer film 24 constructed in accordance with the invention. Because of the described construction of film 24, the polarized visible rays 25 will be strongly reflected without essential changes in color toward a condenser 26, while the heat rays 27 will be highly transmitted through the film 24 and the supporting body 23. The visible rays 25 from which there has been separated a high percentage of the heat rays, pass through the condenser 26 and through a transparency plate or film 28 to a projection objective 29.

Fig. 6 illustrates the manner in which my invention may be utilized on an operation lamp. The numeral 30 designates generally a table upon which it is desired that the visible rays be directed. The operation lamp includes a concavely shaped glass body 31 which supports in depending relation at its central portion, a source of light such as the bulb 32. The bulb 32 is enclosed in a glass cylinder 33 which is attached at its upper end to the concave surface of the body 31 and supports at its lower end a metallic mirror 34 designed to reflect rays from the bulb 32 to the body 31. The concave surface of the body 31 is coated with a multilayer film 35 constructed in accordance with the invention. It will be understood from the foregoing description that the light rays 36 emitted by the bulb 32 will either pass directly through the glass cylinder 33 to the film 35 or be reflected by the mirror 34 onto such film. The visible rays or white light 37 of such emitted light rays 36 will be strongly reflected by the multilayer film 35 onto the table 30, while the heat rays 38 will pass through the film 35 and the glass body 31 into the atmosphere.

I claim:

1. A mirror capable of reflecting the visible rays emitted from a light source and of transmitting the heat rays emitted from such source, comprising a supporting body composed of material capable of passing heat rays therethrough and a reflector consisting of a plurality of layers superimposed on a surface of said support, each of the layers of said reflector being constituted of a transparent, non-metallic material which is substantially non-absorbent of infra-red rays and alternate layers of said reflector being of material having a high index of refraction and the remaining layers of said reflector being of material having a low index of refraction, the inner layers at least of said reflector having a median optical thickness corresponding to about one-quarter of a median wave length of the visible spectrum to be reflected, the superimposed layers in said reflector being arranged to form two interference systems, located wholly on one side of said support and each composed of alternate layers of high and low index of refraction; the spectral reflection band resulting from only one of such systems being centered a little below the medium wave length of the visible spectrum, and the reflection band resulting from only the other of such systems being centered a little above the medium wave length of the visible spectrum, the median optical thickness of the entire reflection band and one of the superimposed layers in said reflector of a material having a low index of refraction and a thickness of at least the optical thickness of a single layer of such systems being located between and separating said two systems, the transmission of said combined systems and intermediate layer, as a whole, being such as to pass the major portion of the rays in the near infra-red region, and the reflection of said combined systems and intermediate layer, as a whole, being such as to reflect at least 80% of the rays in the visible spectrum.

2. A mirror capable of reflecting the visible rays emitted from a light source and of transmitting the heat rays emitted from such source, comprising a supporting body composed of material capable of passing heat rays therethrough and a reflector consisting of a plurality of layers superimposed on a surface of said support, alternate layers of said reflector being of material having a high index of refraction and the remaining layers of said reflector being of material having low index of refraction, each of the inner layers at least of said reflector being constituted of a transparent, non-metallic material which is substantially non-absorbent of infra-red rays and said inner layers having a median optical thickness corresponding to about one-quarter of a median wave length of the visible spectrum to be reflected, the superimposed layers in said reflector being arranged to form at least two interference systems, located wholly on one side of said support and each composed of alternate layers of high and low index of refraction, the spectral reflection band resulting from only one of such systems being centered a little below the medium wave length of the visible spectrum, and the reflection band resulting from only the other of such systems being centered a little above the medium wave length of the visible spectrum, the optical thickness of at least one layer of one system differing from the optical thickness of the layers of the other said system by approximately from 10 to 30%, and a layer of said reflector located between and separating each of said systems and being constituted of a material having a low index of refraction, said material being substantially non-absorbent to infra-red and visible rays emitted from the source, the optical thickness of each of said intermediate layers of low index of refraction being a fraction of the medium wave length of the visible spectrum to be reflected and being such as to provide median transmission of said combined systems as a whole, of the major portion of the rays in the near infra-red region, and to provide reflection of said combined systems as a whole, of at least 80% of the rays in the visible spectrum emitted by such source without essential changes in color of such visible rays.

3. A mirror capable of reflecting the visible rays emitted from a light source and of transmitting the heat rays emitted from such source, comprising a supporting body composed of material capable of passing heat rays therethrough and a reflector consisting of a plurality of layers superimposed on a surface of said support, alternate layers of said reflector being of material having a high index of refraction and the remaining layers of said reflector being of material having low index of refraction, each of the inner layers of said reflector being constituted of a transparent, non-metallic material which is substantially non-absorbent of infra-red rays and the major portion of the visible rays and said inner layers having a median optical thickness corresponding to about one-quarter of a median wave length of the visible spectrum to be reflected, the superimposed layers in said reflector being arranged to form at least two interference systems located wholly on one side of said support and each composed of alternate layers of high and low index of refraction, the spectral reflection band resulting from only one of such systems being centered a little below the medium wave length of the visible spectrum, and the reflection band resulting from only the other of such systems being centered a little above the medium wave length of the visible spectrum, said interference systems differing from one another by the optical thickness of at least one layer within 30%, and separated from each other by a transparent spacing layer of said reflector having a low index of refraction, the optical thickness of said intermediate layers being a fraction of the medium wave length of the visible spectrum to be reflected, and the top layer of said combined systems which borders on air having a low refractive index and an optical thickness of about half the median wave length of the visible spectrum, so as to provide a median transmission of said combined systems, as a whole, of at least 80% of the rays in the near infra-red region, and to provide reflection of said combined systems, as a whole, of at least 80% of the rays in the visible spectrum emitted by such source.

4. A mirror capable of reflecting the visible rays emitted from a light source and of transmitting the heat rays emitted from such source, comprising a supporting body composed of material capable of passing heat rays therethrough and a reflector consisting of a plurality of layers superimposed on a surface of said support, alternate layers of said reflector being of material having a high index of refraction and the remaining layers of said reflector being of material having low index of refraction, each of the inner layers at least of said reflector being constituted of a transparent, non-metallic material which is substantially non-absorbent of infra-red rays and the major portion of the visible rays, the optical thickness of said inner layers increasing gradually from layer to layer so that the optical thickness of the thinnest layer corresponds to one-quarter of a wave length in the blue region of the visible spectrum and the optical thickness of the thickest layer corresponds to one-quarter of a wave length in the red region of the spectrum, the median optical thickness of all said high and low index layers corresponding to about one-quarter of a median wave length of the visible spectrum, so as to provide a reflection band width, measured between the points of 0.75 maximum reflection, of at least 250 m$\mu$ and a median transmission of at least 80% of the rays in the near infra-red region, the superimposed layers in said reflector being arranged to form two interference systems located wholly on one side of said support and each composed of alternate layers of high and low index of refraction, the spectral reflection band resulting from only one of such systems being centered a little below the medium wave length of the visible spectrum, and the reflection band resulting from only the other of such systems being centered a little above the medium wave length of the visible spectrum, and one of the superimposed layers in said reflector of a material having a low index of a refraction and a thickness of at least the optical thickness of a single layer of such systems being located between and separating said two systems.

5. A mirror capable of reflecting the visible rays emitted from a light source and of transmitting the heat rays emitted from such source, comprising a supporting body composed of material capable of passing heat rays therethrough and a reflector consisting of a plurality of layers superimposed on a surface of said support, alternate layers of said reflector being of material having a high index of refraction and the remaining layers of said reflector being of material having low index of refraction, each of the layers of said reflector being constituted of a transparent, non-metallic material which is substantially non-absorbent of infra-red rays and the major portion of the visible rays, said reflector layers having a median optical thickness corresponding to about one-quarter of a medium wave length of the visible light traversing the reflector in such direction that reflection of light occurs near the polarizing angle on each interface of said layers, said superimposed reflector layers being arranged to form at least two interference systems located wholly on one side of said support and each composed of alternate layers of high and low index of refraction, the spectral reflection band resulting from only one of such systems being centered a little below the medium wave length of the visible spectrum, and the reflection band resulting from only the other of such systems being centered a little above the medium wave length of the visible spectrum, said interference systems differing from one another by the optical thickness of at least one layer within 30% and separated from each other by a transparent spacing layer of said reflector having a low index of refraction, the optical thickness of said intermediate layers being a fraction of the medium wave length of the visible spectrum to be reflected, so that at oblique incidence the light vector vibrating in the plane of incidence is strongly suppressed and the light vector vibrating perpendicularly to the plane of incidence is reflected with at least 80% of the rays in the visible spectrum emitted by such source, and the major portion of the rays in the near infra-red region will pass through the said combined reflector.

References Cited in the file of this patent

UNITED STATES PATENTS

| 2,392,978 | Dimmick | Jan. 15, 1946 |
| 2,403,731 | MacNeille | July 9, 1946 |
| 2,412,496 | Dimmick | Dec. 10, 1946 |
| 2,552,184 | Koch | May 8, 1951 |
| 2,624,238 | Widdop et al. | Jan. 6, 1953 |
| 2,660,925 | Turner | Dec. 1, 1953 |
| 2,668,478 | Schroder | Feb. 9, 1954 |

UNITED STATES PATENT OFFICE
Certificate of Correction

Patent No. 2,852,980 September 23, 1958

Hubert Schroder

It is hereby certified that error appears in the printed specification of the above numbered patent requiring correction and that the said Letters Patent should read as corrected below.

Column 4, line 65, after "amplitude |" insert $$\sigma_x |$$

line 74, for that portion of the equation reading $$\approx s \quad \text{read} \quad \approx \sigma,$$

column 5, line 48, for "polar-" read (*polar-*; column 6, lines 27 and 28, strike out "the median optical thickness of the entire reflection band".

Signed and sealed this 13th day of January 1959.

[SEAL]

Attest:
KARL H. AXLINE,
*Attesting Officer.*

ROBERT C. WATSON,
*Commissioner of Patents.*